United States Patent [19]

Horeczko

[11] 4,039,279
[45] Aug. 2, 1977

[54] ANNULAR HEATER

[76] Inventor: George Roman Horeczko, 2545 Pabolo Ave., San Pedro, Calif. 90732

[21] Appl. No.: 611,992

[22] Filed: Sept. 10, 1975

[51] Int. Cl.² ............................................. F24J 3/00
[52] U.S. Cl. .................................... 432/225; 156/497
[58] Field of Search ................ 432/225; 156/391, 497

[56] References Cited

U.S. PATENT DOCUMENTS

| 2,412,758 | 12/1946 | Smith | 432/225 |
| 2,416,412 | 2/1947 | Smith | 432/225 |
| 2,556,116 | 6/1951 | Smith | 432/225 |
| 3,466,020 | 9/1969 | Blinne | 432/225 |
| 3,832,260 | 8/1974 | Straughan et al. | 156/391 |

Primary Examiner—John J. Camby
Attorney, Agent, or Firm—I. Michael Bak-Boychuk

[57] ABSTRACT

Method and apparatus for circumferentially applying heat to a cylindrical object comprising an annular heating cavity which is disposed in surrounding relationship about a peripheral section of the object. A roller supported platform supports the heating cavity relative the object and, by translation, applies heat to progressive sections thereof. In order to accommodate various alignments of the object and therefore the various resulting heat distributions within the cavity the connection between the platform and the annular cavity is adjustable, thus permitting any eccentric alignment thereof relative the object.

7 Claims, 4 Drawing Figures

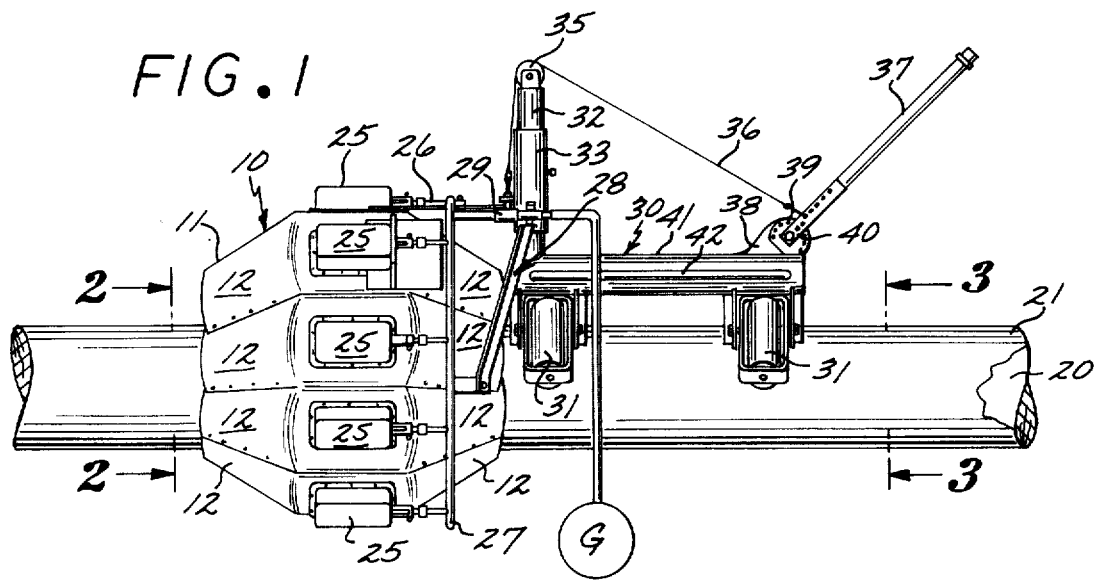
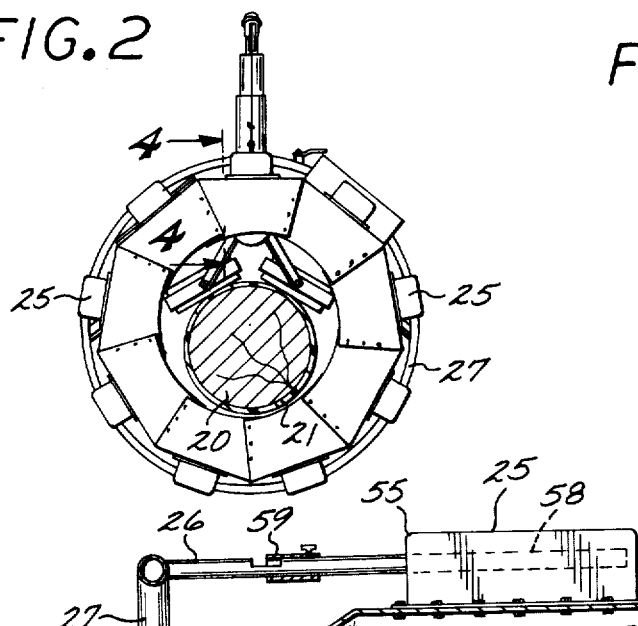
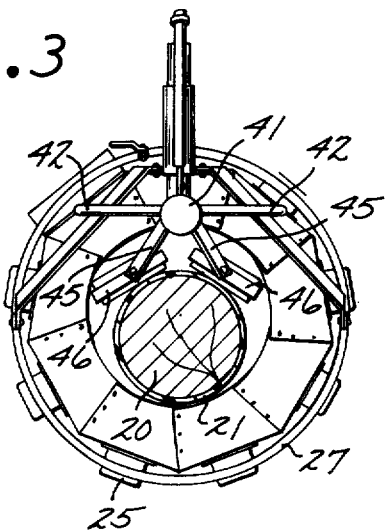
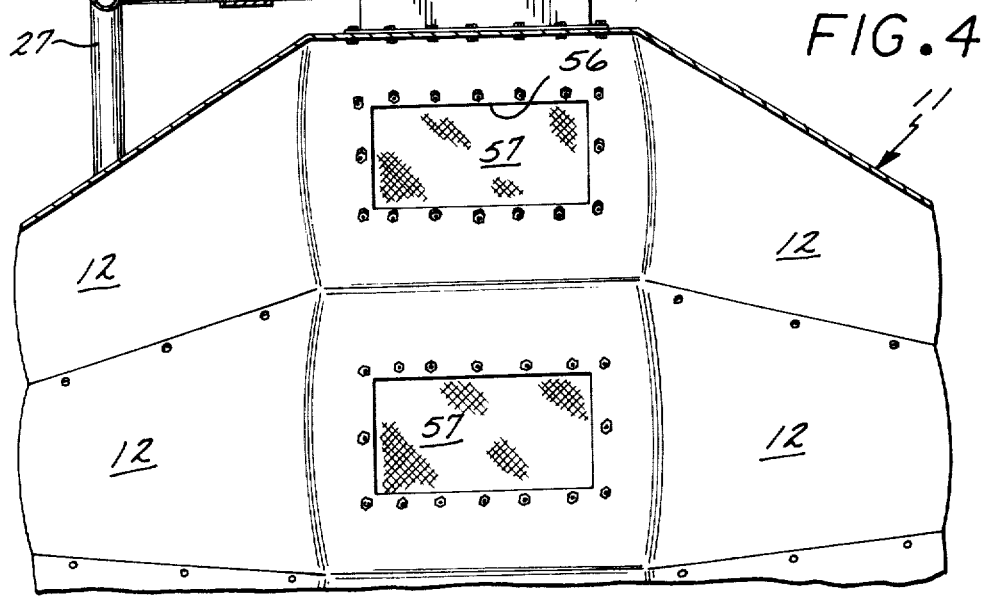

ANNULAR HEATER

BACKGROUND OF THE INVENTION

1. Field of the Invention

The present invention relates to heating devices and more particularly to annular heaters adapted to apply heat to large cylindrical objects.

2. Description of the Prior Art

The use of plastic film around various wooden objects exposed to environmental deterioration has been known in the past. Typically such plastic film is applied around the exterior of objects like pilings or posts by wrapping the post with the plastic film and then fastening the film edges to the post. This manner of attachment, while providing some shielding to the post, is generally loose, particularly after a protracted term of exposure where the normal plastic flows in the film tend to enlarge the dimensions thereof, allowing for progressively larger gaps between the film and the protected post. In applications like marine pilings or harbor pilings, opaque plastic films are usually desired both to limit the sunlight and to limit the amount of oxygenated water flow between the film and the piling. The latter function in particular has been heretofore a source of problems particularly when compounded by the above-mentioned plastic deformation of the film with age. Furthermore the necessary use of fasteners directly attaching the film edges to the post results in stress concentrations should any stretching occur during the installation. One feature of polyethelene film in particular which, while known in the art, has not been successfully applied to piling shields or post shields, is the heat shrinking feature thereof. Generally, polyethelene insulation tubes have been used in electrical applications with particular success. Such insulation tubes, by virtue of their size, do not require any particular techniques of heat distribution during shrinking since generally the size of the article itself is much smaller than the normal variances in the heat source. When applied to large objects even heat distribution is far more difficult to achieve particularly when compounded with the manipulative difficulty of large objects.

SUMMARY OF THE INVENTION

Accordingly, it is the general purpose and object of the present invention to provide a heat shrinking device which is particularly suited to apply an evenly distributed source of heat to large objects like posts or pilings.

Other objects of the invention are to provide a heat shrinking device which is transportable over the post or piling and which, during transport, progressively effects the requisite heat shrinking of the protective film.

Yet further objects of the invention are to provide a toroidal heater adapted to be translated along the longitudinal dimension of a piling or post, such toroidal heater applying circumferentially an evenly distributed level of heat to evenly shrink plastic film surrounding the object.

Briefly these and other objects are accomplished within the present invention by providing an annular heating chamber formed in the manner of an exterior surface section of a toroid, such heating chamber furthermore including around the periphery thereof a plurality of individually controlable burners. This toroidal heating chamber is attached to a telescopically articulated vertical member extending from a roller supported transport frame which can be translated longitudinally along the post or piling.

As is normally occurring in all heating chambers the convective currents therein generally tend to accumulate a larger concentration of hot gases at the top. Therefore, as the toroidal chamber is placed in alignment around a horizontally disposed post or piling, the resulting distribution of heated gas therein would be uneven. For this reason the vertical telescopic translation of the heater is controlled by way of a pulley arrangement which, in turn, is connected to a manually articulated lever. Thus, by controlling the vertical or eccentric displacement of the heater relative a horizontally aligned post or piling and by controlling the individual burners thereof, an even application of heat to the polyethelene film surrounding the post can be achieved. Once this alignment is formed the roller supported platform or transport frame can then be translated along the post, applying a circumferential, evenly distributed ring of heat to the film wrapping the exterior of the post.

BRIEF DESCRIPTION OF THE DRAWING

FIG. 1 is a side view illustrating the use of the present invention while heat shrinking plastic covering around a horizontally disposed post;

FIG. 2 is a front view taken along line 2—2 of FIG. 1;

FIG. 3 is a rear view taken along line 3—3 of FIG. 1; and

FIG. 4 is a sectional view illustrating one detail of the invention taken along line 4—4 of FIG. 2.

DESCRIPTION OF THE SPECIFIC EMBODIMENT

While particular reference is made herein to the application of the present invention in heat shrinking plastic sheets surrounding objects like posts and pilings, such is for purposes of illustration only. It is contemplated that other uses of the invention described herein will become apparent to those skilled in the art beyond the specific examples disclosed herein.

As shown in FIG. 1 the inventive annular heater, generally designated by the numeral 10, comprises a sheet metal shell 11 convolved to approximate the exterior surface section of a toroid. This shape is achieved by splitting the two circumferential end segments of a tubular thin-walled section into a plurality of segments 12 which are then partly overlapped and fastened to each other in this overlapping arrangement. In this manner a section of a thin-walled sheet metal tube is convolved to a shape having end openings smaller than the diameter of the tube. Insertable within the end openings of shell 11 is a post or a piling, shown herein as a post 20, wrapped in a layer of plastic film 21.

While the use of the present invention is fully adapted to any alignment of post 20 relative a horizontal, the most convenient manipulative arrangement contemplated is to align post 20 in a longitudinally horizontal position. In this alignment a support platform, generally designated by the numeral 30, is mounted on the exterior of the post 20, being supported thereat by a plurality of straddled gimballed rollers 31. Extending from the front end of the support platform in an upward direction therefrom is a vertical cylindrical mount 32 which is telescopically received within the interior of a tubular support 33 operatively connected to support shell 11 at any desired eccentric position relative the central axis of the post.

More specifically, again by reference to FIG. 1, shell 11 includes, around the periphery thereof, a plurality of burners 25 each tied by way of a corresponding feed line 26 to a ring manifold 27 which, by way of a triangulated trusswork 28, is attached to the tubular support 33. In addition to these connections ring manifold 27 also connects across a valve 29 to any source of gas or other heating fluid G.

As shown in FIGS. 2 and 3, the radial alignment of the annular heater 10 or, more specifically, the central axis of shell 11 relative the central axis of the post is eccentric to accommodate the larger convective heat build-up within the top section thereof. To accommodate various heat gradients this eccentric alignment is adjustable by way of sliding adjustment of the aforementioned vertical tubular support 33 over mount 32. By reference back to FIG. 1 the vertical mount 32 includes on the free end thereof a roller guide 35 around which a cable 36 is passed to connect between an eccentric point on a pivotal handle 37 and shell 11. Handle 37 is, in turn, pivoted from a pivotal mount 38 formed on the distal end of the horizontal support frame 30. Thus pivotal articulation of handle 37 will concurrently produce a vertical articulation of shell 11 relative the central axis of post 20. When a desired eccentric arrangement is achieved between the shell 11 and post 20, that position is secured by inserting a pin into any one of a plurality of openings 39 formed in a flange 40 attached along the pivotal end of the handle.

Thus as shown in FIGS. 2 and 3, an eccentric alignment of the burner cavity or shell 11 relative the post 20 can be easily achieved by manual articulation to select the location at which the heat gradient is constant. Once this alignment is achieved, the disposition of shell 11 will be maintained in this alignment by virtue of the center of gravity thereof relative the contact plane of rollers 31. To provide for this self aligning feature, platform 30 includes a cylindrical horizontal member 41 having connected thereto a pair of opposed handles 42 extending laterally therefrom. Disposed downwardly from element 41 and aligned inclined planes relative the plane including member 41 and mount 32 are a plurality of roller support frames 45 straddling the post 20. Attached pivotally to the lower ends of support frames 45, are gimbal frames 46 each retaining a corresponding rollers 31. In this manner, rollers 31 are self-aligning to a tangent alignment relative the surface of post 20. In a conventional manner the length of the roller support frames 45 is selected to maintain the contact plane joining the tangent contacts of rollers 31 with posts 20 above the center of gravity of both the support platforms 30 and the annular heater 10. This manner of supports will constantly achieve a vertically eccentric disposition of shell 11 relative the central axis of the post. At this disposition the normal convective currents will collect within the upper section of shell 11 and selective manipulation of handle 37 will allow for the adjustment thereof to locate the circumference of post 20 at a uniform circumferential heat position within the heating cavity.

As shown in more detail in FIG. 4, each burner 25 includes an exterior casing 55 attached to the exterior of shell 11 over corresponding ones of a plurality of openings 56 formed in the surface of the shell. Disposed across each opening 56 is a screen 57 which both diffuses the localized heat source generated at a burner tube 58 within the corresponding burner casing 55. The heat output of each burner tube 58 is further controlled by way of a telescopically adjustable air mixture valve 59 which partly covers an air mixture opening 60 in the associated feed line 26.

By way of this apparatus any desired shrinking of the film 21 can be achieved. Thus film 21 no longer requires fasteners pressed into post 20 for attachment thereof, being secured by shrink fit thereto. The hoop connection of film 21 can therefore be made by way of a bond, or even by way of a localized high heat input from a selected burner 25, which, along the seam, will melt the ends of the film to form a closure.

Obviously many modifications and variations to the above disclosure can be made without departing from the spirit of the invention. It is therefore intended that the scope of the invention be determined solely dependent on the claims hereto.

I claim:

1. Apparatus for applying heat circumferentially to a cylindrical object, comprising:
   an annular heating chamber adapted to surround a peripheral section of said object;
   a plurality of burners disposed around the periphery of said chamber for communicating heat to the interior thereof;
   support platform means mounted for longitudinal translation along said object; and
   adjustable connecting means attached to said support platform means and said annular heating chamber for adjustably positioning said chamber relative said object.

2. Apparatus according to claim 1 wherein:
   said annular heating chamber includes a sheet metal shell conformed to approximate the exterior surface section of a toroid, said shell having end openings smaller than the central section thereof and including apertures disposed around the central periphery thereof in alignment with said burners.

3. Apparatus according to claim 2 further comprising:
   manifold means connected to said burners; and
   a supply of fuel connected to said manifold means.

4. Apparatus according to claim 3 wherein:
   said support platform means includes a frame having handles attached thereto and a plurality of gimballed rollers disposed therefrom in alignment to straddle said object.

5. Apparatus according to claim 4 wherein:
   said adjustable connecting means includes a vertical mount attached to said frame at one end thereof and substantially aligned to radially extend away from said object when said rollers are in straddling contact with the peripheral surface thereof;
   a sleeve telescopically receiving said mount, a structure connecting said sleeve to said annular heating chamber, and pulley means connected between said frame and said sleeve for controlling the telescopic alignment of said sleeve relative said mount.

6. Apparatus according to claim 5, further comprising:
   a plurality of fuel mixture control means each disposed proximate the corresponding juncture of said manifold means with individual ones of said burners.

7. Apparatus according to claim 4 wherein:
   the combined center of gravity of said support platform means and said annular burner is radially closer to the central axis of said object than the radial dimension of a plane joining said rollers.

* * * * *